(12) United States Patent
Restis et al.

(10) Patent No.: US 7,975,857 B2
(45) Date of Patent: Jul. 12, 2011

(54) COOKING UTENSIL SUPPORT APPARATUS

(76) Inventors: Paula Restis, Costa Mesa, CA (US);
Thomas T. Restis, Costa Mesa, CA (US)

( * ) Notice: Subject to any disclaimer, the term of this patent is extended or adjusted under 35 U.S.C. 154(b) by 204 days.

(21) Appl. No.: 12/221,742

(22) Filed: Aug. 6, 2008

(65) Prior Publication Data
US 2009/0101604 A1    Apr. 23, 2009

Related U.S. Application Data

(60) Provisional application No. 61/000,063, filed on Oct. 23, 2007.

(51) Int. Cl.
*A47F 7/00* (2006.01)

(52) U.S. Cl. ........ 211/70.7; 211/60.1; 211/50; 206/553; 206/564

(58) Field of Classification Search ............ 211/49.1, 211/50, 41.14, 70.7, 41.1–41.3, 67, 70.8, 211/70.2, 60.1, 40, 13.1, 11; 206/553, 564, 206/6.1, 448; D7/637–641; 30/298.4; 220/571.1
See application file for complete search history.

(56) References Cited

U.S. PATENT DOCUMENTS

| | | | | |
|---|---|---|---|---|
| D136,831 S | * | 12/1943 | Hurschler | D7/641 |
| D156,958 S | * | 1/1950 | Hoeft | D7/641 |
| D163,151 S | * | 5/1951 | Wagner | D7/637 |
| D165,318 S | * | 12/1951 | Anheuser | D8/93 |
| 2,664,005 A | * | 12/1953 | Kosinski | 211/70.1 |
| 2,807,361 A | | 9/1957 | Junkin | |
| D244,340 S | * | 5/1977 | Ashton | D7/641 |
| 4,515,332 A | | 5/1985 | Scharfy | |
| 4,834,328 A | * | 5/1989 | Hall | 248/37.3 |
| D326,591 S | * | 6/1992 | Hall | D7/637 |
| 5,127,616 A | | 7/1992 | Carney | |
| 5,411,141 A | * | 5/1995 | Bounds | 206/553 |
| D378,564 S | * | 3/1997 | Hall | D7/637 |
| D419,395 S | | 1/2000 | Swanson | |
| D421,879 S | * | 3/2000 | Miller et al. | D7/637 |
| D423,303 S | * | 4/2000 | Morton et al. | D7/637 |
| 6,604,714 B1 | * | 8/2003 | Hall | 248/37.3 |
| D527,957 S | * | 9/2006 | Ranieri | D7/637 |
| D573,417 S | * | 7/2008 | Osbourn | D7/641 |

* cited by examiner

*Primary Examiner* — Darnell M Jayne
*Assistant Examiner* — Devin Barnett
(74) *Attorney, Agent, or Firm* — Gene Scott; Patent Law & Venture Group

(57) ABSTRACT

A cooking utensil support apparatus for catching and containing runoff from supported cooking utensils has a support body with an integral depressed catch well or basin. The support body further has a pair of spaced-apart and mutually parallel walls, each terminating upwardly in a top edge. The top edge of each wall has a plurality of slots for resting cooking utensils therein. The slots extend downwardly from the top edges in mutually aligned pairs between the walls. A tray is positioned below where the working ends of utensils are positioned when resting in the slots so that runoff drips into the tray for easy disposal.

7 Claims, 1 Drawing Sheet

COOKING UTENSIL SUPPORT APPARATUS

CROSS-REFERENCE TO RELATED APPLICATIONS

This application is a non-provisional application describing the same invention as an active provisional application Ser. No. 61/000,063, filed on Oct. 23, 2007; and being filed within one year, hereby claims date priority therefrom.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This disclosure relates generally to cooking utensil support apparatuses. More specifically, this disclosure relates to cooking utensil support apparatuses having means for catching runoff from supported cooking utensils, and which help to keep cooking utensils sanitary and isolated from each other.

2. Description of Related Art Including Information Disclosed Under 37 CFR 1.97 and 1.98

Junkin, U.S. Pat. No. 2,807,361, discloses a tray for utensils having a base member mounted in a tray and having a ridge provided with transverse spaced openings for the reception of utensils. A slide is mounted under the ridge and adapted to slide on the tray. The slide has openings adapted to be in partial registry with the openings in the ridge respectively and a projection adjacent the upper portion of each of the openings in the slide and adapted to close off the upper portion of the openings in the ridge on the longitudinal movement of the slide. The ridge forms a dihedral angle and has opposed slots adjacent its end and below the apex of the ridge for the reception of knives. The opposed slots are at an acute angle to the apex of the ridge and are intersected by common lines perpendicular to a plane bisecting the formed dihedral angle. The apex of the ridge has notched openings at its ends. The ends of the slide are adapted to project alternately into the notched openings and also has the lower portions of its ends cut away so as to pass above the opposed slots in the ridge.

Bounds, U.S. Pat. No. 5,411,141, discloses a support for elevating eating utensils above the surface of a table. The support is fabricated from a material that may be easily and safely disposed. The support is constructed with minimal effort and time. The support is constructed from a single sheet of material such as a heavyweight paper. The support defines four panels; each separated one from another by relief lines. The end panels overlap one another to define a first side. The two middle panels define a second side and the bottom of the support. In order to maintain the close relationship of the end panels, a plurality of tab members is defined on the end panel and extends toward its edge. A plurality of receptacles is provided for receiving the handle portion of each utensil. Each receptacle is defined by cooperating openings defined in the end panels and the middle panel. An indicia region is provided for imprinting a selected message thereon, preferably on the panel. The supports of the present invention may be fabricated in large quantities, with a plurality of supports being fabricated simultaneously from a single sheet of material.

Kosinski, U.S. Pat. No. 2,664,005, discloses a device for holding culinary utensils on a supporting structure so as to prevent the material on the utensils from contacting the structure. The device is also adapted to provide a means for breaking and holding eggs. The device is constructed from a single bland of bendable and easily cleanable material. The device has an elongated flat wall having relatively low upstanding joined flanges at its side edges and one of its end edged. An inverted v-shaped member extends transversely of the wall and has inner and outer leg portions and an apex element joining the leg portions and disposed well above the flanges of the flat wall. The inner leg portion of the member is integrally formed with the other end edge of the wall. An upwardly inclined plate is disposed transversely of the wall and has a lower upwardly facing concavo-convexed flange integrally formed with the outer leg portion of the member. The plate also has a downwardly facing convexo-concave upper flange at its upper portion. The apex element of the member lies in a horizontal plane with the upper flange and has a series of spaced notches therein for receiving the handles of utensils that rest upon the upper edge of the plate.

Carney, U.S. Pat. No. 5,127,616, discloses a device for holding pot lids and/or cooking utensils. The device includes a first generally planar component with separate notches, apertures, ledges or the like for supporting pot lids or cooking utensils. A second generally planar component is mounted to the first planar component to support the first planar component and to selectively receive cooking utensils supported by the first planar component, as well as retain any drippings from the utensils.

Scharfy, U.S. Pat. No. 4,515,332, discloses a rack for supporting culinary utensils and disposing the portion thereof containing food remnants, grease, and the like over a sink or other receptacle capable of collecting and disposing the drippings.

Swanson, US D419,395, discloses an ornamental design for a utensil rest, the utensil rest consisting of a bowl having a notch in which to rest a utensil.

The related art described above discloses various apparatuses for supporting and displaying cooking utensils, and further discloses such apparatuses having receptacles in which to catch food remnants and the like that drip from the stored cooking utensils. However, the prior art fails to disclose a utensil support apparatus having a depressed central well located between a pair of walls, the well providing a novel structure for catching and containing food remnants and the like which drop from supported cooking utensils. The prior art further fails to disclose wall slots having an improved contoured shape that allows the support of utensils of various shapes and sizes. The prior art further fails to disclose slots having an improved structure for supporting large knifes and the like. The prior art further fails to disclose an apparatus structure that provides an improved means for catching drips by supporting utensils at a preferred angle that urges runoff and drips into a catch tray. The present disclosure provides these teachings and therefore distinguishes over the prior art providing heretofore unknown advantages as described in the following summary.

BRIEF SUMMARY OF THE INVENTION

During the process of preparing meals, cooking utensils such as ladles, spoons, spatulas, knifes, tongs, turners, skimmers, pasta servers, scoopers, prongs, peelers, forks, spreaders, and the like, are often set aside during temporary breaks in use. Such utensils are commonly set in places which are either unsanitary or where liquid runoff such as grease, sauce, juices, food particles and the like, will not be captured for later disposal. Heretofore, it has been known to place cooking utensils in trays or other supporting structures, in order to avoid unsanitary surfaces, however, this often leads to an undesired intermixing of food particles on the utensils, which results in introducing undesirable tastes to different food courses. Furthermore, such prior art structures typically do not catch runoff effectively, as, for instance, when runoff is present on cooking utensil shafts and then undesirably drops to table, stove or counter surfaces. It is with these shortcomings in mind that the present invention is conceived to provide an improvement over the prior art with respect to inducing and catching runoff, organizing utensils, and also supporting the cleanliness of kitchen operations.

The present invention distinguishes over the prior art with certain novel features which allow for easy and complete capture of runoffs from utensils, provides for non-intermixing of runoff between utensils, lends itself to quick and easy cleaning, and is conducive to quick placement and removal of utensils of various shapes and sizes.

In this regard, then, the present invention has a support body with a pair of spaced-apart, mutually parallel walls, each with a plurality of slots that hold cooking utensils at an angle. The slots are arrayed to provide a space between the utensils they support, and are constructed to accommodate utensils of various shapes and sizes. Pairs of the slots are mutually aligned between the walls, and provide multiple contact points for supported utensils. A depressed surface, or well, is positioned between the walls providing a place for catching and containing food remnants and the like which drip from the supported utensils.

This disclosure teaches certain benefits in construction and use which give rise to the objectives described below.

A primary objective inherent in the above described apparatus and method of use is to provide advantages not taught by the prior art.

Another objective is to provide a cooking utensil supporting apparatus having a runoff catching depressed surface positioned between mutually parallel walls so that the runoff of liquids is directed to the depressed surface.

A further objective is to provide such an apparatus having angled slots that facilitate utensil positioning to enhance dripping and avoiding mutual contact.

A still further objective is to provide such an apparatus having slots that are uniquely contoured for easy placement and removal of utensils.

A still further objective is to provide such an apparatus having slots that prevent the intermixing of food particles between adjacent utensils.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE DRAWING

Illustrated in the accompanying drawing is a best mode embodiment of the present invention In such drawing.

DETAILED DESCRIPTION OF THE INVENTION

Figure 1:
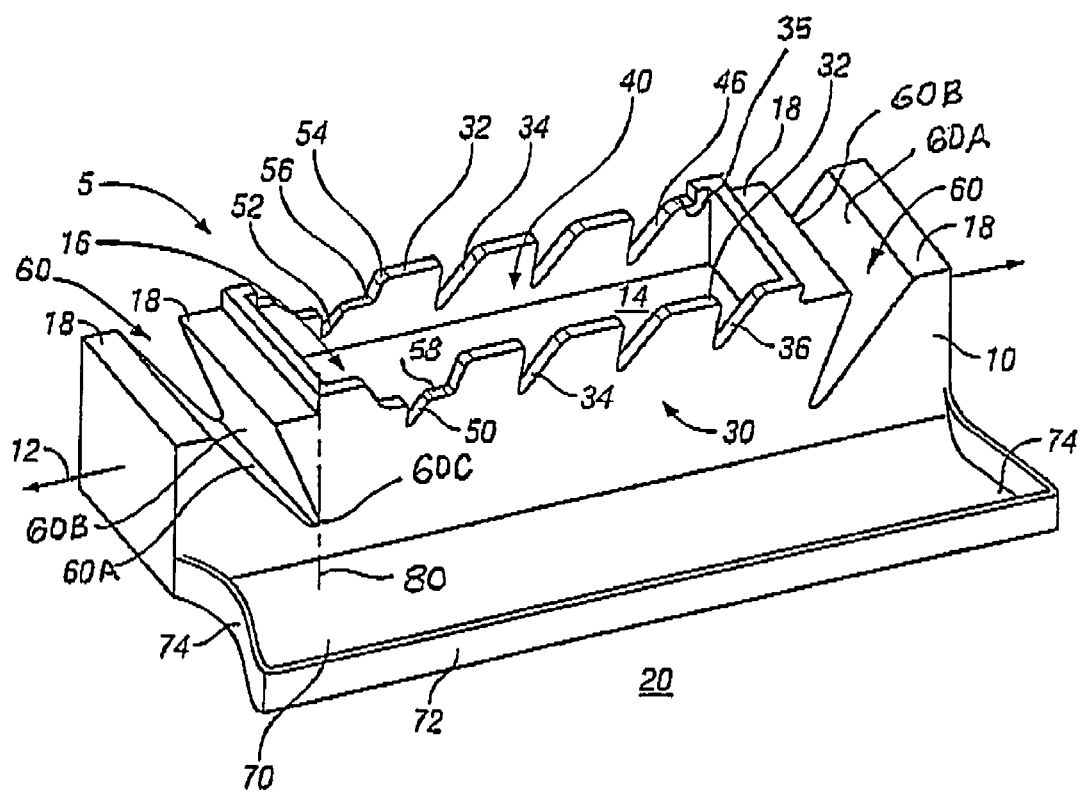
FIG. 1 is a perspective view of the presently described apparatus as seen from one side and slightly above the article.

The above described drawing FIGURES illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it should be understood that what is illustrated is set forth only for the purposes of example and should not be taken as a limitation on the scope of the present apparatus and its method of use.

Described now in detail is a cooking utensil supporting apparatus 5 for supporting cooking utensils, catching runoff from the cooking utensils, keeping the cooking utensils sanitary, and for preventing the intermixing of runoff between the utensils.

Referring now to FIG. 1, a support body 10, preferably of a horizontally elongated configuration defines a longitudinal axis 12, the support body 10 adapted for resting on a horizontal surface 20 such as a stove or counter surface. The support body 10 is preferably made of a dishwasher safe material having one-piece integral construction and preferably has rounded edges and surfaces that are easily rinsed clean. To this end, the support body 10 can be made of stabilized wood, plastic, glass, porcelain, stainless steel, marble, or the like. Because the cooking utensil support apparatus 5 is preferably used during food preparation, the support body 10 is also sized to fit conveniently on a stove-top or other meal preparation surface.

Laterally spaced-apart and mutually parallel first 30 and second 40 walls extend upwardly, preferably vertically from, and integrally with, the support body 10. The walls 30, 40 may extend the length of the support body 10 or, alternatively, only a portion thereof, the later condition shown in FIG. 1. The walls may also be angled, arched or other configurations. Still alternatively, a different number of walls may be substituted for the first 30 and second 40 walls.

Each of the walls terminates upwardly at a top edge 32, the top edge 32 providing at least one, and preferably a plurality of the slots 34 for supporting cooking utensils (not part of the invention) that may be rested in the slots, with the utensils extending laterally between the first 30 and second 40 walls, when setting them down is necessary and convenient. Preferably, the top edge 32 is a horizontally orientated flat surface, however, the top edge may be contoured or angled without departing from the scope of the invention. The top edge 32 of the first wall 30 preferably is elevated relative to the top edge 32 of the second wall 40 for reasons that will be described presently. In FIG. 1 step 35 shows the elevational difference between the two walls 30 and 40, with wall 40 being lower by the amount of step 35. This enables a utensil laid across slots 34 of the walls 30 and 40 to elevate the dripping end of the utensil as it is positioned over tray 70. Preferably pairs the slots 34 are mutually aligned between the walls; a first slot 36 of the pair of slots 34 being located on the first wall 30 and an associated oppositely positioned second slot 38 of the pair of slots 34 being located on the second wall 40. The slots 34 extend downwardly from the top edge 32 into the walls preferably in a non-vertical orientation. Preferably, the slots 34 are oriented relative to the vertical at angles of between 20 and 60 degrees. The walls 30, 40 and slot pairs 32, 32 provide a stable support for cooking utensils and preferably have slot positions for several utensils. The slot angle enables the cooking utensils to rest at a tilt, thus facilitating runoff of liquids on the utensils. Furthermore, the separation of the slots 34 prevents the utensils from touching each other and also elevates them above the surface that the invention apparatus rests upon.

As shown in FIG. 1, the slots 34 may be U-shaped and V-shaped. Alternatively, as also shown in FIG. 1, one of the slots 34 is a contoured slot 50 having a relatively wider slot portion 54 contiguous with the top edge 32, and a relatively narrower slot portion 52 contiguous with the relatively wider slot portion 54 and extending downwardly therefrom. The relatively narrow portion 52 of the contoured slot may also have sidewalls 56 that are discontinuous at horizontal step portion 58, with the relatively narrower slot portion 52 contiguous with the step portion 58 and extending terminally downwardly therefrom.

A depressed surface 14, is positioned between the walls 30, 40 and is below the lowest surface of the slots 34. The depressed surface 14 and the walls 30, 40 define a well 16 ideal for catching and containing food remnants and runoff that usually drips from supported utensil shafts. In order to further facilitate the efficient catching of such drips, etc., it is preferable that the slots 34 in the respective walls are positioned such as to cause utensils laid across opposing pairs to be held at a non-horizontal attitude. This may be realized by the first wall 30 being higher than the second wall 40 and both walls having uniform slot sizes and shapes, or by a uniform wall height and different slot depths, or by any combination of wall heights and slot sizes, shapes and depths. Depth, in this case, refers to the distance that the slot extends downwardly into the wall from the top edge 32. The improved drip catching efficiency is the result of runoff moving along the utensil downhill due to the utensil's angle to accumulate in the well 16.

In order to securely support cooking knifes and the like, slots 60, are provided as shown, attending downwardly from an upwardly facing surface 18 of the support body 10, The knife slot 60 is preferably located on at least one longitudinal end of the support body 10, spaced apart from the well 16 and distinct from the slots 34 or the walls 30, 40. Furthermore, the knife slot 60 extends laterally between the first 30 and second 40 walls of the support body 10, and extends downwardly into the support body 10 at an angle that is preferably non-vertical to enhance runoff. FIG. 1 shows an embodiment in which a knife slot 60 is present at each longitudinal end of the apparatus 5. The knife slot 60, also relbrred to as a "further V-shaped slot." has two opposing surfaces 60A and 60B which extend downwardly into the support body 10, the surfaces 60A and 60B both are positioned on a common side of a vertical 80 which extends through a vertex 60C of the further slot 60 as shown in FIG. 1. whereby liquid drainage on the opposing surfaces 60A amd 608 is directed toward the walls 30 and 40 so that it is able to pool within horizontal tray 70.

Extending laterally from, and integral with, at least one of the first 30 and second 40 walls is an integral horizontal tray 70 for catching and containing remnant runoff from the working ends of the supported utensils. Preferably, the tray 70 extends the length of the support body 10; however, it may extend beyond the length of the support body 10, or only a portion thereof. The tray 70 preferably has opposing sides 74 that are divergent to an extent which allows the tray 70 to catch runoff from utensils supported in both the wall slots 34 and the knife slots 60. Tray 70 also preferably provides an upwardly protruding peripheral rim 72 which acts to contain runoff within tray 70.

The embodiments described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A cooking utensil supporting apparatus for collecting liquid drainage from utensils resting on the apparatus, the apparatus comprising:

a support body enabled for resting on a horizontal surface, the support body having a first and a second spaced-apart and mutually parallel walls, each of the walls terminating upwardly with a horizontal top edge, the walls each having a plurality of downwardly extending slots therein, with pairs of said slots positioned in the spaced-apart walls in corresponding alignment whereby a utensil may be rested within one of the correspondingly aligned slots;

a further V-shaped slot having two opposing surfaces extending downwardly into the support body and spaced apart from the walls the opposing surfaces positioned for holding a utensil in a tilted orientation;

a depressed surface of the apparatus positioned between the walls below the top edges thereof, whereby liquid drainage within the plurality of slots is directed into, and collected within, the depressed surface;

wherein the top edge of the first of the walls is elevated relative to the top edge of the second of the walls; and further comprising a horizontal tray extending away from the support body adjacent to the first of the walls, whereby, due to a difference in height of the walls, a dripping end of a utensil is elevated above the horizontal tray when a handle of the utensil is rested on the walls.

2. The cooking utensil supporting apparatus of claim 1, wherein one of said slots extends downwardly in a non-vertical orientation, whereby utensils rested within the slots are held at an acute angle relative to the vertical.

3. The cooking utensil supporting apparatus of claim 1, wherein one of the slots is at least one of U-shaped and V-shaped.

4. The cooking utensil supporting apparatus of claim 1, wherein one of the slots has a relatively wider slot portion and a relatively narrower slot portion, the relatively wider slot portion contiguous with the top edge and terminating with a horizontal step portion, the narrower slot portion contiguous with the step portion and terminating downwardly therefrom.

5. The cooking utensil supporting apparatus of claim 1, wherein at least one of the slots in one of the first and second walls is deeper than at least one of the slots in the other of the first and second walls.

6. The cooking utensil supporting apparatus of claim 1, wherein the horizontal tray has an upwardly protruding peripheral rim, the support body and the peripheral rim formed as a closed barrier around the horizontal tray, whereby liquid received within the tray is contained within the tray by the peripheral rim.

7. The cooking utensil supporting apparatus of claim 1, wherein the support body has therein a second V-shaped slot extending into an upwardly facing surface of the support body between, and lateral, to the first and second walls.

* * * * *